MULTIPLE MAGNETIC HEAD ASSEMBLY

Filed Feb. 18, 1965

INVENTORS
JAN A. GEURST
GEORGE L. WALTHER
BY
Frank R. Trifari
AGENT

United States Patent Office 3,373,416

Patented Mar. 12, 1968

3,373,416

MULTIPLE MAGNETIC HEAD ASSEMBLY

Jan Albert Geurst and George Ludwig Walther, Emmasingel, Eindhoven, Netherlands, assignors to North American Philips Company, Inc., New York, N.Y., a corporation of Delaware.

Filed Feb. 18, 1965, Ser. No. 433,615

Claims priority, application Netherlands, Feb. 25, 1964, 64—1,746

5 Claims. (Cl. 340—174.1)

Figure 1:
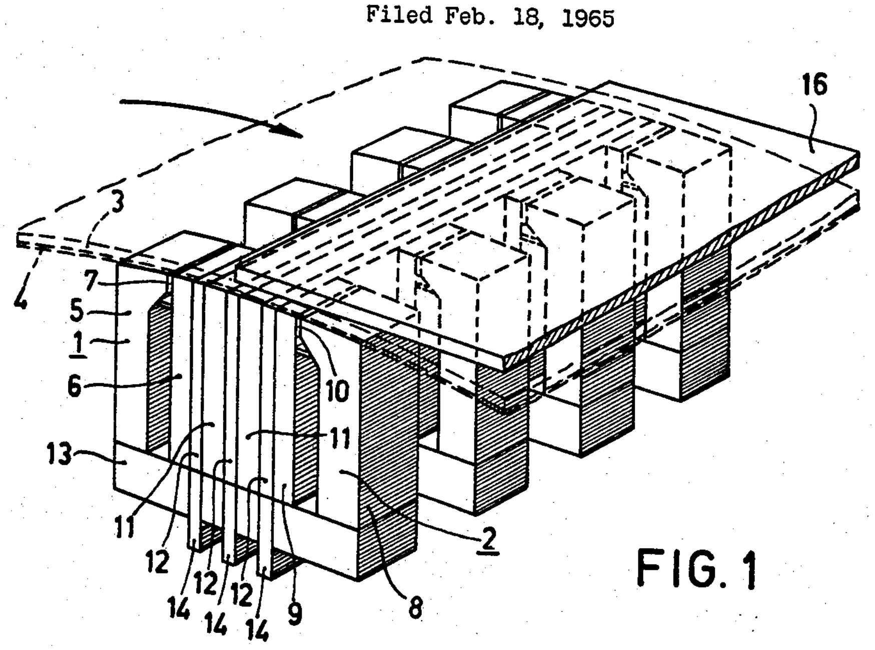

This invention relates to magnetic heads and more particularly to a multiple head construction having low relative interference. Multiple magnetic recording and reproducing heads for reproducing one or more parallel records on a carrier, provided on one side with magnetisable material, may take the form of at least two interconnected magnetic circuits lying one after the other and consisting each of at least two parts of sintered, oxidic, ferromagnetic material. Between the two circuit parts is a useful gap filled with nonmagnetisable material affixing the two parts to each other. In order to avoid the relative influence between head parts it has been proposed to arrange at least two plates of sintered, oxidic, ferromagnetic material between the magnetic circuits embracing the gap. Between the two plates is at least one plate of electrically conducting, non-magnetisable material, while between each circuit and the adjacent plate of sintered, oxidic, ferromagnetic material there is also arranged a plate of electrically conducting, non-magnetisable material. With a multiple magnetic head structure as described the so-called cross-talk between the recording circuit and the reproducing circuit is much reduced.

From theoretical calculations, the results of which were confirmed by extensive tests, it has been found that the relative influence, particularly the cross-talk, can be further reduced and practically obviated if, in accordance with the invention, there is added to the above described structure a plate of electrically poor conducting non-magnetisable, preferably sintered, oxidic, ferromagnetic material on the rear side of the carrier, and partly at least very near said side, the width of said plate being at least equal to the over-all width of all tracks and their intervals, said plate being arranged preferably so as to be adjustable in the direction of movement of the carrier in an asymmetric position relative to an imaginary line lying centrally between a gap of a recording circuit and a gap of a circuit reproducing the same track.

In one embodiment of the invention the plate extends parallel to the carrier, whilst the distance between the plate and the carrier is at the most 2 mm., preferably between 0.1 and 0.5 mm. The construction of the device is thus fairly simple.

In an other embodiment of the invention the plate may be arranged so that it is at an angle of not more than 45° to the direction of movement of the carrier and that it is connected with a plate of electrically good conducting material, extending parallel to the carrier at a distance therefrom of at the most 2 mm., preferably between 0.1 and 0.5 mm. The adjustment of the first plate is thus simplified.

In order to avoid possible leakage of the magnetic flux on the lower side of the device, it is advantageous in accordance with a further embodiment of the invention to allow one or more, and preferably all, plates lying between the circuits and consisting of electrically conducting, non-magnetisable material to protrude slightly beyond the circuits on the lower side of the multiple head.

The invention will be described more fully with reference to the drawing, which shows diagrammatically a few embodiments of the invention. In this drawing FIG. 1 shows diagrammatically and isometrically an elevation of a multiple magnetic head and a screen.

Figure 2A:
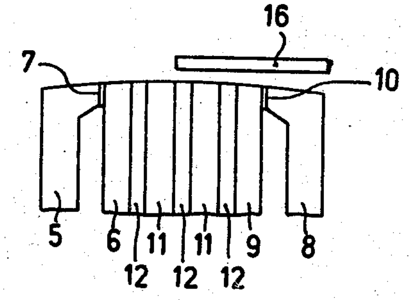
Figure 2B:
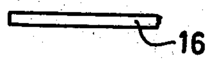
Figure 2C:
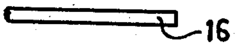
Figure 2D:
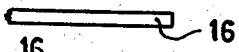
Figure 3:
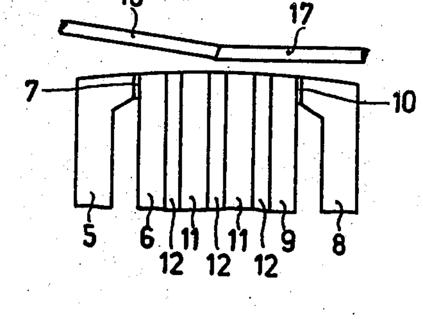

FIGS. 2*a*, 2*b*, 2*c* and 2*d* show diagrammatically a few screen dispositions and FIG. 3 shows another embodiment of said screen.

FIG. 1 shows a multiple magnetic head comprising four recording circuits 1 and four reproducing circuits 2. A flexible carrier 3, moving along the head in the direction of the arrow, is provided on the side of the head with a layer of magnetisable material 4. Each recording circuit consists of two portions 5 and 6 of sintered oxidic ferromagnetic material, between which a useful gap 7 is provided, which is filled with non-magnetisable material, for example glass, which affixes the portions 5 and 6 to each other.

The reproducing circuits 2 also consist of two portions 8 and 9 of the same material as the recording circuit 1 and between the portions 8 and 9 there are provided useful gaps 10, which are filled with the same material affixing the portions 8 and 9 to each other as that of the gaps 7.

Between the circuits 1 and 2 there are disposed two plates 11 of sintered, oxidic ferromagnetic material, which are separated by plates 12 of silver or another electrically good conducting, non-magnetisable material. A magnetic shunt 13 for the magnetic circuits 1 and 2 is fastened to the lower side of the head. The silver plates 12 have joining plates 14 in this shunt and protrude at 15 slightly from the shunt 13.

Although with such a multiple magnetic head the relative action between the recording part and the reproducing part is eliminated for a large part, calculations and experiments following these calculations have shown that a small amount of influence, a so-called cross-talk phenomenon is left between the recording circuit and the reproducing circuit associated therewith.

Also according to said calculations, corroborated by experiments, it has surprisingly been found that the residual influence may be suppressed by arranging, substantially parallel and relatively near the rear side of the carrier 3, i.e. the side where the magnetisable layer is not present, a plate 16 of electrically poor conducting, magnetisable, preferably sintered oxidic, ferromagnetic material, which is disposed asymmetrically to the whole head and is preferably adjustable in the direction of movement of the carrier. The plate 16 has a width equal to at least the overall width of the tracks and intermediate spaces. The distance between the carrier 3 and the inner side of the plate 16 must be small, for example 0.1 to 0.5 mm. It is furthermore found that such a screen does substantially not increase the (undesirable) coupling between two adjacent recording circuits or reproducing circuits.

The plate 16 may be disposed at different places. FIG. 2*a*, in which the reference numerals of the magnetic head shown diagrammatically designate the same parts as in FIG. 1, shows a place of the plate 16 approximately equal to that shown in FIG. 1. In FIG. 2*b* the plate is slightly shifted towards the reproducing side of the head and in FIGS. 2*c* and 2*d* the plate 16 is shifted completely to the left and is shown in two different positions. The plate 16 must, however, always be asymmetrical to the centre of the whole head. This centre is located on a line which divides the distance between the gaps 7 and 10 in the middle.

The favourable effect of the plate 16 may probably be explained, because this plate brings out an alteration of the relative magnetic potential of the magnetic circuits and screens. When the flux distribution in the recording circuit has a zero line at the place of the gap, compensation of the influence is obtained, so that this influence is substantially suppressed. It might be expected that the plate 16 would increase the coupling between the recording circuits and the reproducing circuits, but it is found that this is not true. The plate 16 may as an alternative be disposed at a small angle to the surface of the head, as is shown in FIG. 3. The plate 16, which is preferably made, as stated above, from sintered, oxidic ferromagnetic material and which may, in general, also be made from electrically poor conducting magnetisable material, is connected with a plate 17, which is made of electrically conducting, non-magnetisable material, for example silver or copper. Also in this case the relative reaction between the recording circuit and the associated reproducing circuit is substantially eliminated, whilst the silver or copper plate contributes to eliminate the relative reaction between the record. Moreover, the disposition shown is found to have the advantage that the adjustment of the correct place of the plate 16 relative to the head is carried out more easily.

What is claimed is:

1. A device for reducing or suppressing the relative influence in a multiple magnetic head for recording and reproducing one or more parallel records in one or more parallel corresponding tracks on a unilaterally magnetisable carrier, said heads comprising at least two magnetic circuits one for recording and one for reproducing lying one after the other and connected with each other, each circuit consisting of at least two portions of sintered, oxidic, ferromagnetic material, and having a useful gap filled with non-magnetisable material between said two portions and affixing the two portions to each other, at least two plates of sintered, oxidic, ferromagnetic material arranged between said magnetic circuits, at least one plate of electrically conducting, non-magnetisable material arranged between said two plates, a plate of electrically conducting, non-magnetisable material positioned between one circuit and the adjacent plate of sintered, oxidic ferromagnetic material, a plate of electrically poor conducting, magnetisable, ferromagnetic material positioned adjacent at least in part to the rear side of said carrier, said plate having a width at least equal to the over-all width of the tracks and their intermediate spaces, said plate being adjustably arranged in the direction of movement of the carrier in an asymmetrical position relative to an imaginary line lying centrally between a gap of a recording circuit and a gap of a circuit reproducing the same track.

2. A device as claimed in claim 1, characterized in that the plate near the rear side of the carrier is substantially parallel to the carrier and the distance between the carrier and the plate is at the most 2 mm.

3. A device as claimed in claim 1, characterized in that the plate is at an angle of not more than 45° to the direction of movement of the carrier and is connected with a plate of electrically good conducting material parallel to the carrier and at a distance therefrom of at the most 2 mm.

4. A device as in claim 1, characterized in that on the lower side of the multiple head one or more plates of electrically conducting, non-magnetisable material located between the circuits protrude slightly beyond the circuits themselves.

5. A device as claimed in claim 1, characterized in that the plate near the rear side of the carrier is substantially parallel to the carrier and the distance between the carrier and the plate is between 0.1 and 0.5 mm.

References Cited

UNITED STATES PATENTS

| | | | |
|---|---|---|---|
| 3,252,153 | 5/1966 | Mos | 340—174.1 |
| 3,064,333 | 11/1962 | Kristiansen et al. | 340—174.1 |
| 2,922,231 | 1/1960 | Witt et al. | 340—174.1 |

TERRELL W. FEARS, *Primary Examiner.*

A. I. NEUSTADT, *Assistant Examiner.*